June 4, 1957 K. E. DORIOT 2,794,857
CONTROL CIRCUIT FOR COMMUNICATIONS APPARATUS
Filed July 28, 1953
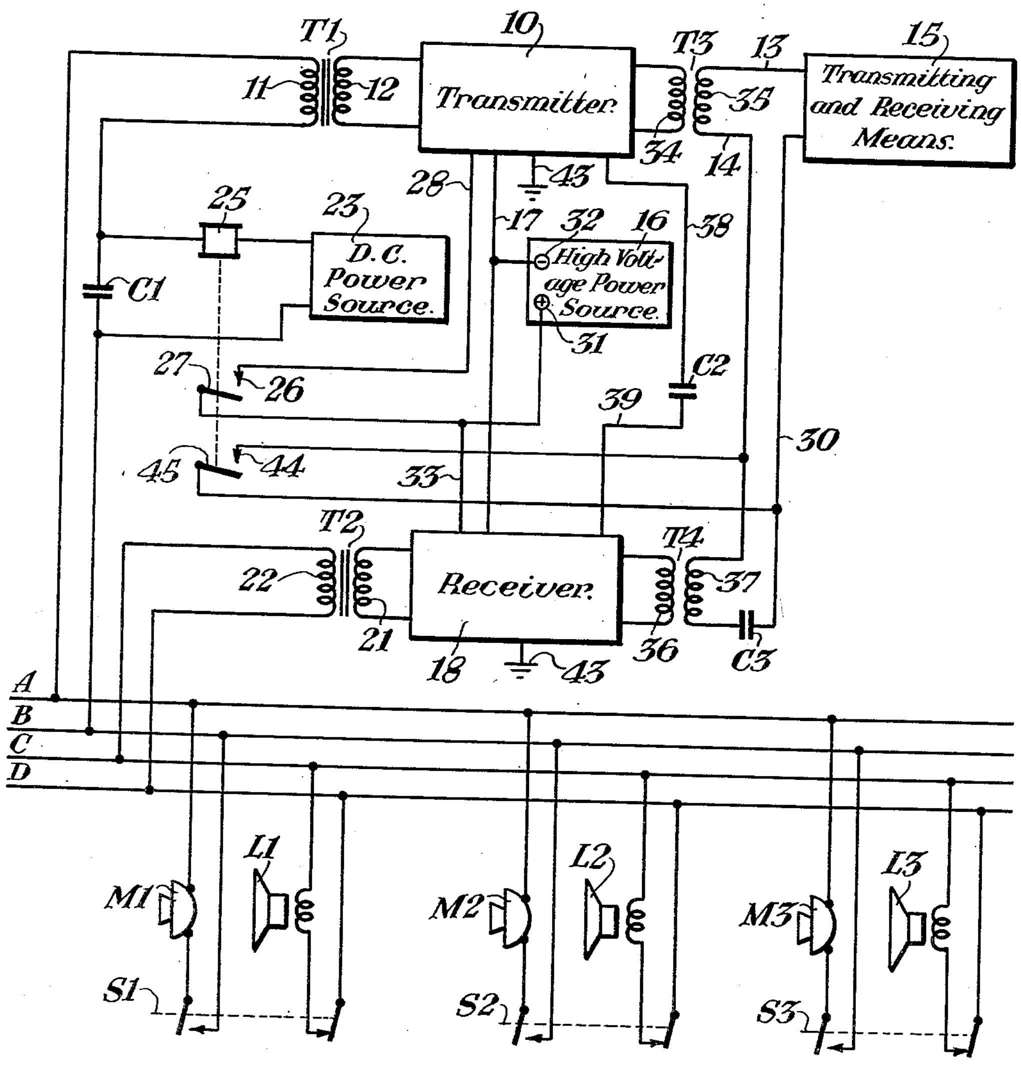
INVENTOR.
Kenneth E. Doriot.
BY
W. L. Stout
HIS ATTORNEY

United States Patent Office 2,794,857

Patented June 4, 1957

2,794,857

CONTROL CIRCUIT FOR COMMUNICATIONS APPARATUS

Kenneth E. Doriot, Verona, Pa., assignor to Westinghouse Air Brake Company, Wilmerding, Pa., a corporation of Pennsylvania Application July 28, 1953, Serial No. 370,676

13 Claims. (Cl. 179—1)

My invention relates to improvements in control circuits for communications apparatus, and more particularly to control circuits for communications apparatus of the type wherein a plurality of stations, each having a microphone and a loudspeaker device, are employed.

My invention contemplates the employment of a relay, energized at the same instant that a preselected microphone circuit is closed, to enerize the transmitting circuit. Whereas a number of prior art devices employ voice-operated relays and relays responsive to sound waves to connect an antenna to a transmitting device, or to energize and control the transmitting apparatus in some other fashion, these prior art devices usually require complex circuits in addition to the electrical connections necessitated by the microphone itself. Some of these prior art circuits also have the disadvantage that there is a slight delay between the first sound spoken into the microphone and the energization of the transmitter, with the result that a short portion of the sound or speech is lost at the beginning of the transmission.

The apparatus of my invention avoids the aforementioned disadvantages of the prior art by employing a relay having its winding connected directly in series with the microphone. When the microphone circuit is closed prior to transmission, the relay is immediately energized and the transmitter is rendered operative.

Accordingly, it is a primary object of my invention to provide a new and improved control circuit for communications apparatus.

Another object is to provide a new and improved control circuit having a relay operatively connected in series with the microphone itself.

Another object is to provide a new and improved control circuit suitable for use in communications apparatus having a plurality of communications stations.

Still a further object is to provide a new and improved control circuit in which no portion of the speech to be transmitted is lost as a result of the automatic control feature of the circuit.

Other objects and advantages will become apparent after a study of the accompanying specification when taken in connection with the accompanying drawing in which the single figure thereof is a schematic circuit diagram partially in block form of the preferred embodiment of the invention.

Whereas any convenient number of stations may be employed, by way of example three stations are shown having microphones M1, M2 and M3, respectively, connected by way of push buttons or switches S1, S2 and S3, respectively, to a pair of cables or trunk lines A and B. Stations 1, 2 and 3 also have loudspeakers or other transducers L1, L2 and L3, respectively, located thereat, these transducers being connected by way of another set of contacts on the aforementioned switches S1, S2 and S3, respectively, to a pair of cables or trunk lines C and D. Cable or lead A is connected to one terminal of the primary 11 of a suitable audio frequency transformer T1 which has the secondary 12 thereof connected to a transmitter, generally designated by the reference numeral 10, and which preferably includes oscillator, buffer and amplifier stages for generating a carrier frequency in addition to modulation apparatus fed from secondary 12. The other terminal of primary 11 is connected by way of a capacitor C1 to the aforementioned trunk line or cable B, and the last named terminal of primary 11 is also connected by way of the winding 25 of a relay, and a low voltage microphone and relay D. C. power source of any suitable design, generally designated by the reference numeral 23, to the aforementioned cable B.

A receiver of any suitable design, generally designated by the reference numeral 18, and preferably including several amplifier stages and a demodulator, has its output applied to the primary 21 of an audio transformer T2, of any convenient design, which has the secondary 22 thereof connected in shunt with the aforementioned cables or leads C and D for applying the output of the receiver to the loudspeakers or transducers L1, L2 and L3, in accordance with the instant positions or settings of the aforementioned switches S1, S2 and S3, respectively. The receiver has a conventional sensitivity control, not shown, and receives its input from the secondary 36 of transformer T4. Lead 39 is preferably connected to the control grid of one electron tube, not shown, in the receiver 18, for conducting a portion of the amplifier modulated output of transmitter 10 to the receiver, for reasons to be hereinafter more fully apparent. A ground connection 43 may be provided if desired.

A source of power 16 is provided for both the transmitter 10 and receiver 18, having negative terminal 32 and positive terminal 31. Negative terminal 32 is connected by way of lead 17 to both the aforementioned transmitter 10 and receiver 18. Positive terminal 31 is connected by way of lead 33 to the aforementioned receiver 18, and is also connected by way of a first set of contacts 26 and 27 of the aforementioned relay and lead 28 to the transmitter 10.

As aforementioned, the transmitter 10 is preferably composed of oscillator, buffer, and amplifier stages, with suitable modulating apparatus. Lead 38 is preferably connected to the plate or anode of the modulated stage or any succeeding stage, and by way of capacitor C2 to lead 39, for supplying a small amount of energy to receiver 18. A ground connection 43 may be provided if desired.

The output stage of the transmitter 10 is connected to primary 34 of output transformer T3, which has one terminal of secondary 35 thereof connected by way of lead 13 to any suitable transmitting and receiving means 15, which may be of conventional design, such for example as an antenna, or collector rails, power lines, trolley lines or telephone lines. The other terminal of secondary 35 is connected by way of lead 14 to one terminal of primary 37 of the aforementioned transformer T4. The other terminal of primary 37 is connected by way of capacitor C3 and lead 30 to the common transmitting and receiving means 15. Connected across leads 14 and 30, as shown, are a second set of normally open contacts 44 and 45 of the aforementioned relay having winding 25.

It is to be noted in connection with the hereinbefore description of the circuit that the individual microphone circuits consisting respectively of microphone M1 and switch S1, microphone M2 and switch S2, and microphone M3 and switch S3, are connected through lines A and B to the audio transformer T1. The audio transformer T1 is connected to a suitable modulating device in the carrier frequency transmitter 10. The microphone and relay D. C. power source 23 is a low voltage power source which furnishes direct current to the transmitting-receiving relay having winding 25 and the microphones, which may be of the carbon type. The D. C. power source 23 and the transmitting-receiving relay winding 25 are by-passed for audio frequencies by capacitor C1. It is to be noted that the receiver 18 is connected to the high voltage power source 16 at all times whereas the transmitter 10 is connected to the high voltage power source 16 and thus energized only during transmissions while the transmitting-receiving relay is energized by the application of direct current. Since, as aforementioned, the transmitter 10 has a portion of its generated energy coupled to the circuit of the receiver 18 by the lead 38, capacitor C2, and lead 39, the receiver 18 will at all times detect the transmitter signal and impress the audio signal obtained by demodulation across the aforementioned audio output transformer T2, the secondary of transformer T2 being connected to the aforementioned lines C and D which in turn go to loudspeakers L1, L2 and L3 with their respective switches. Contacts 44 and 45 short circuit the primary 37 during periods of transmission so that the receiver 18 does not receive the full output of transmitter 10. As aforementioned, lead 39 is preferably connected to the control grid of the first or second amplifier tube.

As aforementioned, at each of the talking stations there are two sets of contacts on the switch, a normally open set of contacts and a normally closed set of contacts, connected in series with the microphone and loudspeaker, respectively. Upon closing the switch at any station, the microphone circuit is energized and the loudspeaker circuit is deenergized or rendered inoperative.

The normally open sets of contacts on the switches at the various talking stations allow the microphones to be deenergized and not to shunt the input of the transmitter except when it is desired to transmit. The normally closed sets of contacts at the various talking stations are used to open the loudspeaker circuit at a selected station while talking so that feedback does not occur from the loudspeaker output to the microphone. With this system, it is possible to talk between any of the talking stations, and also by way of the receiver 18 and transmitter 10 to communicate by radio or line with stations outside the system. While employing radio communication, the audio frequency current from any one of the microphones connected to trunk lines A and B modulates the carrier in transmitter 10 and the modulated carrier is impressed across the common transmitting and receiving means 15. This transmitted signal is received by receiving apparatus, not shown, at some remote location and demodulated, and the audio is in turn emitted from a loudspeaker thereat, not shown. This same audio signal is emitted from all of the loudspeakers at the respective stations except the station where the conversation is originated. The number of stations and the number of loudspeakers are limited only by the audio output capacity of the aforementioned receiver 18, which may be made as large as desired.

Whereas I have shown four lines A, B, C and D as trunk lines or cables between the various talking stations, it is to be understood that three lines could be used with one line common to both the loudspeaker and microphone circuits. Whereas I have described my invention with reference to carbon microphones, it is to be understood that other types of microphones could be employed. For example, velocity or dynamic microphones could be utilized, having circuit arrangements in which a low D. C. potential source is used in series with the microphones, or the windings of microphone transformers, and a relay of sufficient sensitivity employed.

If desired, the feed connection including leads 38 and 39 and capacitor C2 could be dispensed with, and a small resistor placed in series with the lead to contact 44 or contact 45, so that the short circuit of primary 37 would not be complete, and a small amount of energy would reach and energize the receiver 18 during periods of transmission by transmitter 10.

If desired, other relay contact arrangements for controlling the receiver input may be employed.

Although I have herein shown and described only one form of apparatus embodying my invention, it is to be understood that various other changes and modifications may be made therein within the scope of the appended claims without departing from the spirit and scope of my invention.

Having thus described my invention, what I claim is:

1. In a control circuit for communications apparatus, in combination, a microphone; a relay having a winding and a pair of contacts; a transformer having a primary and a secondary; a switch having a set of normally open contacts; a first source of power; a circuit connecting said primary, said winding, said first source of power, said microphone, and said set of switch contacts in series; transmitter means operatively connected to said secondary and modulated therefrom; and a second source of power for said transmitter means, said second source of power being connected to said transmitter means by way of said pair of relay contacts, operation of said switch to close its contacts energizing said relay to close its contacts and apply the power from said second source to said transmitter means to energize the same.

2. In a control circuit according to claim 1, additional elements including receiver means continuously operative and receptive to energy from said transmitter means; said switch having a second set of normally closed contacts; a loudspeaker; and a circuit for connecting the output of said receiver means to said loudspeaker by way of said second set of contacts.

3. A control circuit for communications apparatus comprising, a first station having a first switch with a normally open set of contacts and a normally closed set of contacts, a first microphone circuit including a first microphone connected in series with said normally open set of contacts, and a first transducer circuit including a first transducer connected in series with said normally closed set of contacts; a second station having a second switch with a set of normally open contacts and a set of normally closed contacts, a second microphone circuit including a second microphone connected in series with said last named set of normally open contacts, and a second transducer circuit including a second transducer connected in series with said last named set of normally closed contacts; a transformer having a primary and a secondary; a relay having a winding and a pair of normally open relay contacts; a first source of power; a pair of trunk connections connecting said first and second microphone circuits in shunt with each other; said primary, said winding, and said first source of power being connected in series across said pair of trunk connections; transmitter means operatively connected to said secondary and adapted to be modulated therefrom; an additional pair of trunk connections connecting said first and second transducer circuits in shunt with each other; receiver means; means applying the output of said receiver means to said additional pair of trunk connections; a second source of power, said second source of power being operatively connected to said transmitter means by way of said pair of relay contacts to energize said transmitter means while the relay is energized; and means applying a portion of the output of said transmitter means to the input of said receiver means.

4. In a control circuit for communications apparatus having transmitting means, and receiving means continuously operative and adapted to receive a portion of the energy output of the transmitting means, a plurality of microphones including at least first and second microphones, a plurality of sound-producing transducers including at least first and second transducers, a plurality of switches including at least first and second switches each having a set of normally open contacts and a set of normally closed contacts, a first pair of leads, means connecting said first microphone and the normally open set of contacts of said first switch in series across said first pair of leads, means connecting said second microphone and the normally open set of contacts of said second switch in series across said first pair of leads, a second pair of leads, means connecting said first transducer and the normally closed set of contacts of said first switch in series across said second pair of leads, means connecting said second transducer and the normally closed set of contacts of said second switch in series across said second pair of leads, means connecting the output of said receiving means across said second pair of leads, a first source of power, relay means having a winding and a pair of normally open relay contacts, coupling means connected to said transmitting means, circuit means connecting said first source of power, said coupling means and said relay winding in series across said first pair of leads, and a second source of power operatively connected to said transmitting means by way of said pair of relay contacts, closing of a selected one of said switches energizing said relay and transmitting means, sound originating at the microphone associated with the selected switch being emitted from the transducer associated with the other of said switches.

5. A control circuit according to claim 4, wherein said relay is additionally characterized as having an additional pair of normally open contacts, and including in addition means operatively connected to said additional pair of contacts and to said transmitting means and receiving means for limiting the amount of energy received by said receiving means while said transmitting means is energized.

6. In a control circuit for communications apparatus, in combination, a microphone; a relay having a winding and first and second pairs of normally open contacts; first coupling means; a switch having a set of normally open contacts and a set of normally closed contacts; a first source of power; a circuit connecting said coupling means, said relay winding, said first source of power, said microphone and said set of normally open switch contacts in series; transmitter means operatively connected to said coupling means and modulated therefrom; a second source of power for said transmitter means, said second source of power being connected to said transmitter means by way of said first pair of relay contacts, operation of said switch to close its set of normally open contacts energizing said relay to close said first pair of relay contacts and apply the power from said second source to said transmitter means to energize the same, receiver means, a loudspeaker, means connecting said loudspeaker and said set of normally closed switch contacts in series across the output of said receiver means, additional means coupling the output of said transmitter means to the input of said receiver means, said second pair of relay contacts being shunted across said additional coupling means to substantially short circuit said input while the transmitter means is operative to thereby limit the amount of energy reaching said receiver means.

7. In a control circuit according to claim 6, additional capacitor means operatively connecting said transmitter means and said receiver means to supply a small amount of transmitter energy to said receiver means.

8. In a control circuit for communications apparatus, in combination, a microphone; a relay having a winding and first and second pairs of normally open contacts; coupling means; a switch having a set of normally open contacts; and a set of normally closed contacts; a first source of power; a circuit connecting said coupling means, said winding, said first source of power; said microphone, and said set of normally open contacts in series; transmitter means operatively connected to said coupling means and modulated therefrom; a second source of power for said transmitter means, said second source of power being connected to said transmitter means by way of said first pair of relay contacts, operation of said switch to close its normally open contacts energizing said relay to close said first pair of relay contacts and apply the power from said second source to said transmitter means to energize the same; receiver means; a loudspeaker; means connecting said loudspeaker and said set of normally closed switch contacts in series across the output of said receiver means; and common conductor means, said common conductor means being operatively connected to the output of the transmitter means and operatively connected to the input of the receiver means, said second pair of relay contacts being shunted across said input to substantially short circuit said input while the transmitter means is operative and limit the amount of energy reaching said receiver means.

9. In a control circuit according to claim 8, additional capacitor means operatively connecting said transmitter means and said receiver means to supply a small amount of transmitter energy to said receiver means.

10. A control circuit for communications apparatus comprising microphone means adapted to have an energizing current applied thereto, means for controlling the flow of current through said microphone means, transmitter means operatively connected to said microphone means and including means for generating a carrier frequency and means for modulating said carrier frequency, receiver means continuously operative and coupled to said transmitter means to receive a limited portion of the energy generated therein, sound producing means coupled to the output of said receiver means, and means connected to said microphone means and responsive to a flow of energizing current through said microphone means for controlling the operability of said transmitter means.

11. A control circuit for communications apparatus according to claim 10 wherein said means for controlling the flow of current through said microphone means includes in addition means for controlling the operability of said sound producing means.

12. A control circuit for communications apparatus comprising microphone means adapted to have a current applied thereto, means for controlling the flow of current through said microphone means, transmitter means operatively connected to said microphone means and including means for generating a carrier frequency and means for modulating said carrier frequency, receiver means continuously operative and adapted to receive energy of said carrier frequency, sound producing means operatively coupled to the output of said receiver means, and means connected to said microphone means and responsive to a flow of current through said microphone means for controlling the operability of said transmitter means, said last named means also limiting the amount of energy received by said receiver means while the transmitter means is operating.

13. A control circuit for communications apparatus according to claim 12 wherein said means for controlling the flow of current through said microphone means includes in addition means for controlling the operability of said sound producing means.

References Cited in the file of this patent

UNITED STATES PATENTS

| | | |
|---|---|---|
| 2,131,388 | Place | Sept. 27, 1938 |
| 2,502,122 | Bossant | Mar. 28, 1950 |
| 2,596,013 | Doriot | May 6, 1952 |